UNITED STATES PATENT OFFICE.

MORRIS W. HEDDEN, OF OREGON CITY, OREGON.

PROCESS OF TREATING WASTE SULFITE LIQUOR.

1,130,817. Specification of Letters Patent. Patented Mar. 9, 1915.

No Drawing. Application filed December 12, 1914. Serial No. 876,978.

*To all whom it may concern:*

Be it known that I, MORRIS W. HEDDEN, a citizen of the United States, and a resident of Oregon City, Clackamas county, State of Oregon, have invented certain new and useful Improvements in the Process of Treating Waste Sulfite Liquor, of which the following is a specification.

My invention relates to a novel process of treating the waste sulfite liquors from the digesters of sulfite pulp mills which now run to waste in large quantities.

It has especial reference to an improvement of the process set forth by Dr. Otto Grothe in his United States Patent dated February 17th, 1914 and numbered 1,087,911.

Briefly the Grothe process consists of five steps: 1. Neutralization of the waste liquor. 2. Concentrating the neutral liquor somewhat. 3. Subjecting the neutralized and concentrated liquor to the action of a cyanid under heat and pressure, which recovers by precipitation sulfite of calcium. 4. Precipitating from the remaining liquor an organic cyanogen compound by the addition of a mineral acid. 5. Filtration and drying of this precipitate.

By experiment it has been discovered that the fourth step, the addition of a mineral acid, is very costly and unsatisfactory. The patent states page 1, lines 89 to 96: "The resulting liquor which is now free from sulfite of calcium is acidulated by a mineral acid, for instance, hydrochloric or sulfuric acid, whereby a copious, brownish precipitate of an organic cyanogen compound is obtained that may be separated from the liquid by filtration." In practice it is found that large quantities of these expensive mineral acids must be used to effect precipitation and that mere acidulation is not sufficient to obtain the desired results. Besides being costly in this particular the use of so much acid also renders necessary the use of acid resisting apparatus. I have discovered that equally good results may be obtained by the use of common salt, sodium chlorid, as a substitute for the mineral acids, the valuable characteristics of the precipitate being in no way impaired and that the product equally with that of Dr. Grothe's process precipitates gelatin, glue, pancreatin, etc., and is absorbed by animal skin.

After the sulfite of calcium has been precipitated by the digestion of the neutral liquor with a cyanid, sodium chlorid is added to the remaining liquor at ordinary temperatures, until a saturated solution is obtained. The resulting precipitate is then filtered, washed and dried in the usual way, high temperatures being avoided as suggested by Dr. Grothe. And this precipitation may also be brought about by the use of many other of the soluble mineral salts, such as potassium chlorid, sodium and potassium nitrate, etc., in fact all those substances classed as electrolytes have the power to precipitate the organic cyanogen compounds from the liquor, and this action appears to be dependent in large part upon the degree of ionization of the different soluble salts used. The action of the soluble mineral salts is more effective and rapid if a little mineral acid is added to the saturated solution, but this addition of such mineral acid is not at all necessary to my improved process.

What I claim is:

1. In a process of treating waste sulfite liquors, which consists essentially of digesting the neutral liquor with a cyanogen compound and thus removing the sulfur bearing group, the addition of sodium chlorid to the remaining liquor to precipitate the organic cyanogen compounds therein.

2. In a process of treating waste sulfite liquor, which consists essentially of digesting the neutral liquor with a cyanogen compound and thus removing the sulfur bearing group therefrom, the addition of sodium chlorid to the remaining liquor at ordinary temperatures until the saturation point is reached, to effect substantially complete precipitation of the organic cyanogen compounds therefrom.

3. In a process for treating waste sulfite liquor, which consists essentially of digesting the neutral liquor with a cyanogen compound and thus removing the sulfur bearing group, the addition of a soluble mineral salt to the remaining liquor to precipitate the organic cyanogen compounds therefrom.

4. In a process for treating waste sulfite liquor, which consists essentially of digesting the neutral liquor with a cyanogen compound, thus removing the sulfur bearing group therefrom, the addition of a soluble mineral salt to the remaining liquor at ordinary temperatures until the saturation point is reached, effecting substantially complete precipitation of the organic cyanogen compounds therein.

5. In a process for treating waste sulfite liquor, which consists essentially of the digestion of the neutral liquor with a cyanogen compound, thus removing the sulfur bearing group therefrom, the addition of an electrolyte, other than a mineral acid, to the remaining liquor at ordinary temperatures to the saturation point, to effect substantially complete precipitation of the organic cyanogen compounds therein.

6. In a process for treating waste sulfite liquor, which consists essentially of digesting the neutral liquor with a cyanogen compound, thus removing the sulfur bearing group, the addition of a soluble mineral salt to the remaining liquor at ordinary temperatures until the saturation point is reached and the acidulation with a mineral acid, after saturation, thereby effecting substantially complete precipitation of the organic cyanogen compounds.

In witness whereof I have hereunto signed my name to this specification in the presence of two subscribing witnesses.

MORRIS W. HEDDEN.

Witnesses:
F. F. SULLIVAN,
F. D. SIMMONS.